United States Patent
Kwon et al.

(10) Patent No.: US 8,493,924 B2
(45) Date of Patent: Jul. 23, 2013

(54) PREAMBLE GENERATION METHOD FOR RANDOM ACCESS IN A WIRELESS COMMUNICATION SYSTEM

(75) Inventors: Yeong Hyeon Kwon, Gyeongki-do (KR); Min Seok Noh, Gyeongki-do (KR); Jin Sam Kwak, Gyeongki-do (KR); Dong Cheol Kim, Gyeongki-do (KR); Sung Ho Moon, Gyeongki-do (KR); Seung Hee Han, Gyeongki-do (KR); Hyun Woo Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 322 days.

(21) Appl. No.: 12/933,315

(22) PCT Filed: Mar. 19, 2009

(86) PCT No.: PCT/KR2009/001412
§ 371 (c)(1),
(2), (4) Date: Sep. 17, 2010

(87) PCT Pub. No.: WO2009/116819
PCT Pub. Date: Sep. 24, 2009

(65) Prior Publication Data
US 2011/0019694 A1  Jan. 27, 2011

Related U.S. Application Data

(60) Provisional application No. 61/038,038, filed on Mar. 19, 2008, provisional application No. 61/044,048, filed on Apr. 10, 2008.

(30) Foreign Application Priority Data

Oct. 10, 2008  (KR) .................. 10-2008-0099460

(51) Int. Cl.
*H04W 4/00* (2009.01)

(52) U.S. Cl.
USPC ........................................ 370/329; 370/474

(58) Field of Classification Search
None
See application file for complete search history.

(56) References Cited

U.S. PATENT DOCUMENTS

| | | | |
|---|---|---|---|
| 7,801,180 B2 * | 9/2010 | Cai et al. ................. | 370/474 |
| 2004/0165676 A1 | 8/2004 | Krishnan et al. | |
| 2004/0170157 A1 * | 9/2004 | Kim et al. ................. | 370/349 |
| 2005/0105460 A1 | 5/2005 | Suh et al. | |
| 2006/0056528 A1 | 3/2006 | Jung et al. | |
| 2008/0043671 A1 * | 2/2008 | Moon et al. ............... | 370/329 |
| 2008/0212704 A1 * | 9/2008 | Seto et al. ................. | 375/260 |
| 2010/0105405 A1 * | 4/2010 | Vujcic ..................... | 455/452.1 |
| 2011/0222504 A1 * | 9/2011 | Ma et al. ................... | 370/330 |

FOREIGN PATENT DOCUMENTS

| KR | 10-2005-0048344 | 5/2005 |
|---|---|---|
| KR | 10-2005-0105489 | 11/2005 |
| KR | 10-2006-0023863 | 3/2006 |

* cited by examiner

*Primary Examiner* — Min Jung
(74) *Attorney, Agent, or Firm* — Morgan, Lewis & Bockius LLP (57) ABSTRACT

A method for generating a preamble for a random access in a wireless communication system is provided. The method includes: dividing a preamble sequence into sequence subsets each corresponding to each of a plurality of antennas; and generating a preamble by using the sequence subsets corresponding to each of the plurality of antennas. A method for generating a preamble for a random access supporting multiple antennas in a wireless system can be provided.

6 Claims, 10 Drawing Sheets

PREAMBLE GENERATION METHOD FOR RANDOM ACCESS IN A WIRELESS COMMUNICATION SYSTEM

The present application is a national stage of PCT International Application No. PCT/KR2009/001412, filed Mar. 19, 2009, and claims the benefit of US Provisional Application Nos. 61/038,038, filed Mar. 19, 2008, and 61/044,048, filed Apr. 10, 2008. The present national stage application also claims the benefit of Korean Patent Application No. 10-2008-0099460, filed Oct. 10, 2008.

TECHNICAL FIELD

The present invention relates to wireless communication and, more particularly, to a method for generating a preamble for a random access in a wireless communication system.

BACKGROUND ART

A next-generation multimedia wireless communication system, on which research is actively ongoing, is required to process various information such as image data, radio data, and the like, beyond the voice-oriented services at the early stage, and transmit the processed data. Currently, $4^{th}$-generation wireless communication system developed following the $3^{rd}$-generation wireless communication system aims at supporting a high speed data service of downlink of 1 Gbps (Gigabits per second) and uplink of 500 Mbps (Megabits per second). Downlink refers to communication from a base station (BS) to a user equipment (UE) and uplink refers to communication from the UE to the BS.

The purpose of a wireless communication system is to enable multiple users to perform reliable communication regardless of their locations and mobility. In this respect, however, wireless channels have non-ideal characteristics such as a path loss, noise, a fading phenomenon caused by multi-path, intersymbol interference (ISI), Doppler effect due to terminal mobility, and the like. Thus, various techniques have been developed to overcome the non-ideal characteristics of the wireless channels and enhance reliability of wireless communication.

Reliable techniques supporting a high speed data service may include OFDM (Orthogonal Frequency Division Multiplexing), MIMO (Multiple Input Multiple Output), and the like.

OFDM that can attenuate an inter-symbol interference effect with a low complexity is considered following the post-$3^{rd}$ generation. The OFDM converts serially inputted data symbols into the N number of parallel data symbols, includes them in the N number of separated subcarriers, and transmits the same. The subcarriers maintain orthogonality in a frequency domain. The respective orthogonal channels experience mutually independent frequency selective fading, and the intervals of transmitted symbols are lengthened to minimize the inter-symbol interference. OFDMA refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, resultantly, frequency resources are mutually exclusively allocated to the users.

MIMO improves a data transmission and reception efficiency and a spectral efficiency by using multiple transmission antennas and multiple reception antennas. The MIMO technique includes spatial diversity, spatial multiplexing, beamforming, and the like.

A UE matches downlink synchronization through a downlink synchronization channel and matches uplink synchronization through random access or ranging in the process of setting synchronization with a BS. Besides the uplink synchronization, the UE may perform random access to entire a network, perform handover, and acquire uplink radio resources.

When the BS does not have information regarding UE capability such as the number of antennas the UE uses, the BS assumes that the UE uses one antenna and transmits a downlink signal. In this case, although the BS transmits downlink signals through multiple antennas, a transmission method based on diversity is the only method that can be applicable as a multi-antenna scheme. Likewise, in case of the uplink synchronization, the BS cannot know about UE performance and also cannot know about whether UEs accessing the same resource domain have any difference in their performance.

In the random access process, the UE and the BS cannot know about each other, a preamble that can be shared by every UE within a cell is assumed. The UE transmits a preamble through a random access channel (RACH) or a ranging channel to the BS. When the multi-antenna scheme is intended to be applied to the RACH, the RACH should be designed in consideration of basic configuration of the UE. However, the BS cannot previously know about the configuration of the UE. Also, the RACH is a basic channel for every UE within the cell the UE can access without a negotiation with the BS. Thus, in the existing system, the multi-antenna scheme is not applied to the RACH. In the existing system, the process of generating a preamble for a random access is designed on the assumption of a single antenna UE, and preamble is transmitted on the assumption of the single antenna UE.

However, this does not conform with the next-generation wireless communication system. In addition, the use of only a single antenna by a multi-antenna UE degrades power efficiency. In case of a UE using multiple antennas, output power is the sum of power of each antenna. That is, a proper link budget can be maintained between the UE and the BS when the UE transmits a preamble by using all the antennas. Thus, a preamble structure for a random access allowing for an increase in performance according to the number of antennas of the UE is required. In addition, a method for transmitting a preamble that can acquire a diversity gain of the multiple antennas is required. In this case, a preamble must be transmitted without causing interference between UEs having various performances within the cell.

Resultantly, a method for generating a preamble for a random access supporting multiple antennas and a method for performing random accessing by using the generated preamble are required.

SUMMARY OF INVENTION

Technical Problem

An object of the present invention is to provide a method for generating a preamble for a random access supporting multiple antennas in a wireless communication system.

Technical Solution

In one aspect, there is provided a method for generating a preamble for a random access in a wireless communication system. The method may include: dividing a preamble sequence into sequence subsets each corresponding to each of a plurality of antennas; and generating a preamble by using the sequence subsets corresponding to each of the plurality of antennas.

In another aspect, there is provided a method for performing random accessing in a wireless communication system. The method may include: dividing a preamble sequence into sequence subsets each corresponding to each of a plurality of antennas; generating a preamble by using the sequence subsets corresponding to each of the plurality of antennas, and transmitting the same; and receiving a random access response including timing alignment information.

In another aspect, there is provided a method for generating a preamble for a random access in a wireless communication system. The method may include: dividing a plurality of subcarriers into subcarrier subsets corresponding to each of a plurality of terminals; and generating a preamble from a preamble sequence by using the subcarrier subsets corresponding to each of the plurality of antennas.

In another aspect, there is provided a user equipment (UE) including: a plurality of antennas; and a preamble generator configured to divide a preamble sequence into sequence subsets corresponding to each of the plurality of antennas and generate a preamble by using the sequence subsets corresponding to each of the plurality of antennas.

Advantageous Effects

A method for generating a preamble for a random access supporting multiple antennas in a wireless communication system can be provided. Thus, the overall system performance can be improved.

MODE FOR INVENTION

Figure 1:
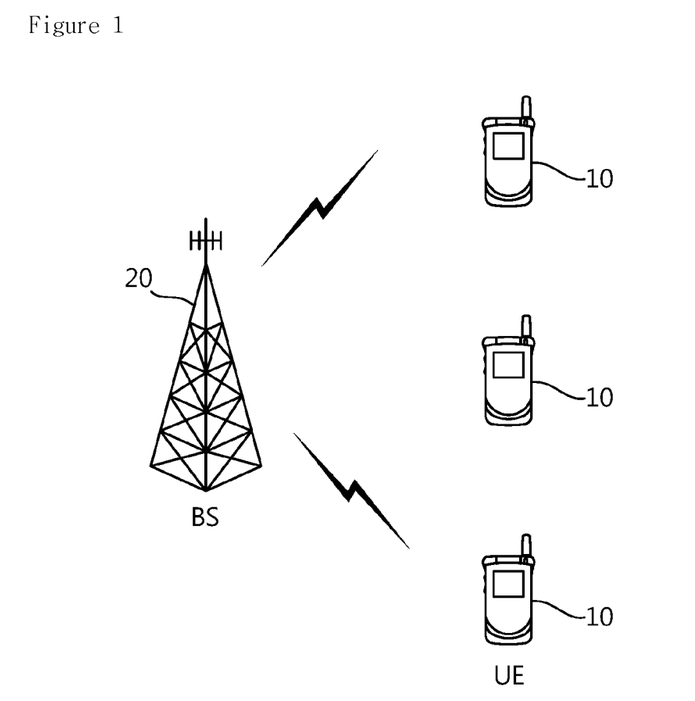
FIG. 1 illustrates a wireless communication system.

FIG. 1 shows a wireless communication system. The wireless communication system is widely deployed to provide a variety of communication services such as communication of voice, packet data, etc.

Referring to FIG. 1, the wireless communication system includes user equipments (UEs) 10 and a base station (BS) 20. The UEs 10 may be fixed or mobile, and may be referred to by other terminologies such as mobile station (MS), user terminal (UT), subscriber station (SS), wireless device, etc. The BS 20 generally refers to a fixed station that communicates with the UEs 10 and may be called by other terminologies such as node-B, base transceiver system (BTS), access point (AP), etc. One BS 20 may provide a service to at least one cell. Cells are areas to which the BS 20 provides a communication service. In general, downlink refers to communication from the BS 20 to the UEs 10, and uplink refers to communication from the UEs 10 to the BS 20. In downlink, a transmitter may be a part of the BS 20, and a receiver may be a part of the UEs 10. In uplink, a transmitter may be a part of the UEs 10, and a receiver may be a part of the BS 20.

There is no limitation to a duplex scheme employed by the wireless communication system, and TDD (Time Division Duplex), FDD (Frequency Division Duplex) or H-FDD (Half-duplex FDD) may be employed. The TDD refers to a scheme in which an uplink transmission and a downlink transmission are performed at different points in time while occupying the same frequency band. The FDD refers to a scheme in which the uplink transmission and the downlink transmission occupy different frequency bands and are simultaneously performed. The H-FDD refers to a scheme in which the uplink transmission and the downlink transmission occupy different frequency bands and cannot be performed at the same time. That is, in the H-FDD scheme, the uplink transmission and the downlink transmission are performed at different points in time at different frequency bands.

The wireless communication system may be an SISO (Single Input Single Output) system or an SIMO (Single Input Multiple Output) system, as well as a MIMO (Multiple Input Multiple Output) system or a MISO (Multiple Input Single Output) system.

The multi-access scheme employed by the wireless communication system is not limited, and various multi-access schemes such as well-known TDMA (Time Division Multiple Access), FDMA (Frequency Division Multiple Access), CDMA (Code Division Multiple Access), SC-FDMA (Single Carrier-Frequency Division Multiple Access), or OFDMA (Orthogonal Frequency Division Multiplexing Access) can be employed. The wireless communication system may use different multi-access schemes for uplink and downlink. For example, uplink may use SC-FDMA, and downlink may use OFDMA.

Figure 2:
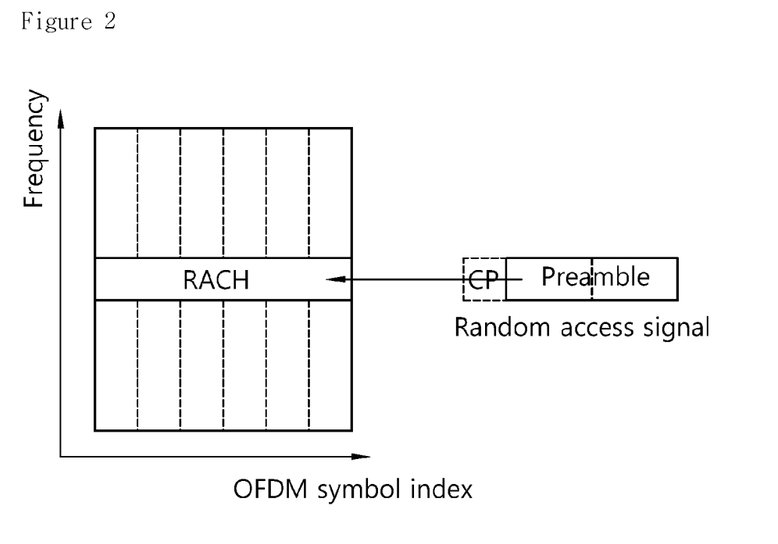
FIG. 2 illustrates an example of the structure of a random access channel.

FIG. 2 illustrates an example of the structure of a random access channel.

With reference to FIG. 2, a random access channel (RACH) is allocated to a certain portion of a resource domain. The resource domain may include OFDM symbols in a time axis and subcarriers in a frequency axis. The RACH may be allocated to a group of localized subcarriers. Or when a frequency axis is set as a logical resource domain by grouping distributed subcarriers, the RACH may be allocated to a portion of a logical resource domain. A UE transmits a random access signal via the RACH. That is, the UE inserts the random access signal into resource domain to which the random access channel has been allocated, and transmits the same. The RACH may be allocated to be longer than the length of the random access signal. In this case, the RACH may be allocated in consideration of a round trip delay of the random access signal.

The random access signal includes a preamble. The random access signal may further include a cyclic prefix (CP).

The preamble is generated through a preamble sequence. As the preamble sequence, a CAZAC (Constant Amplitude Zero Auto-Correlation) sequence, a pseudo-random sequence, and the like, may be used. The CAZAC sequence may include, for example, a GCL (Generalized Chirp-Like) sequence, a ZC (Zadoff-Chu) sequence, and the like. The pseudo-random sequence may be implemented by a polynomial generator. The implementation of the pseudo-random sequence may be referred to section 8.4.7.3 of IEEE (Institute of Electrical and Electronics Engineers) standard 802.16-2004 "Part 16: Air Interface for Broadband Wireless Access Systems".

When a sequence set having a plurality of preamble sequences as elements are already determined, the UE selects a preamble sequence from the sequence set. The UE generates a preamble through the selected preamble sequence. The preamble may be generated in a time domain or in a frequency domain according to its generation basis.

A method of generating a preamble in the time domain includes a method of directly interpolating a preamble. A method of generating a preamble in the frequency domain includes a method for directly mapping a preamble sequence to a subcarrier. Another method for generating a preamble in the time domain or in the frequency domain is as follows.

Figure 3:
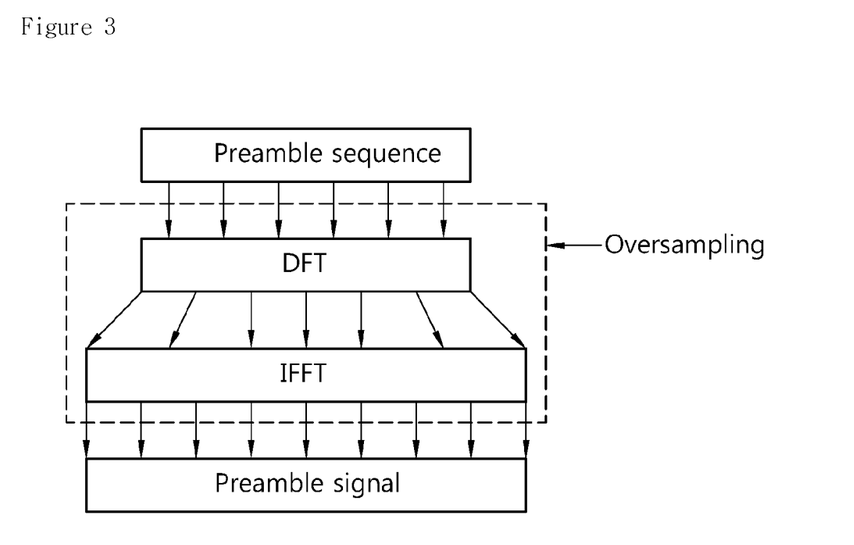
FIG. 3 illustrates a method of generating a preamble in a time domain.

FIG. 3 illustrates a method of generating a preamble in the time domain.

With reference to FIG. 3, a preamble signal is generated by sequentially applying DFT (Discrete Fourier Transform) and IFFT (Inverse Fast Fourier Transform) to the preamble sequence. In detail, DFT is performed on the preamble sequence of the time domain to output a frequency domain symbol. IFFT is performed on the frequency domain symbol to generate a preamble in the time domain. From this, the preamble is oversampled.

Figure 4:
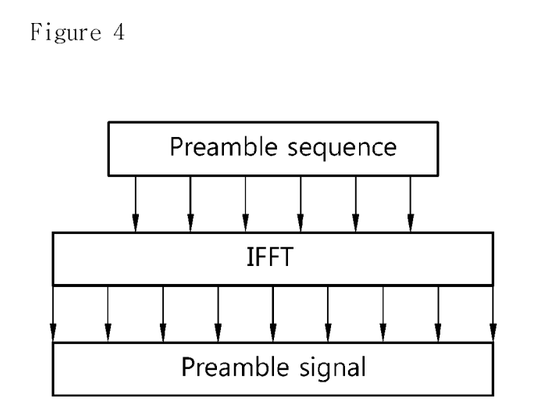
FIG. 4 illustrates a method of generating a preamble in a frequency domain.

FIG. 4 illustrates a method of generating a preamble in a frequency domain.

With reference to FIG. 4, IFFT is applied to the preamble sequence to generate a preamble signal. That is, IFFT is performed on the preamble sequence of the frequency domain to generate a preamble of a time domain.

The random access signal may have a repeated structure. When a repeated pattern of a preamble is created in the time domain, the preamble sequence may be repeatedly processed simply. Or, a signal obtained by upsampling a preamble sequence may be simply repeated or processed. In case in which a repeated pattern of the preamble is created in the frequency domain, when the preamble sequence is applied to subcarriers, it is applied like 0, x, 2×, 3×, . . . , of subcarriers. From this, x-times repeated pattern of the preamble can be created.

When the random access signal does not include a CP, a preamble generated from the preamble sequence becomes the random access signal. The UE may immediately transmit the generated preamble. When the random access signal includes a CP, a portion by the length of the CP is duplicated from the generated preamble and the CP is added to the preamble. In case of IEEE 802.16, the random access signal has the CP and a repeated structure.

Because channel information is not valid, the BS detects the random access signal according to a non-coherent method. The non-coherent method is a method of detecting a particular sequence from a reception signal without performing channel estimation. The BS performs the process of detecting every available signal structure to attempt to detect a particular preamble sequence. For example, the BS attempts to detect every preamble sequence of a sequence set to detect a particular preamble sequence. The BS may use the detected particular preamble sequence as an ID (Identifier) for identifying a UE. The BS broadcasts a random access response message corresponding to the detected particular preamble sequence.

When the response message corresponds to the preamble sequence the UE has transmitted, the UE performs a synchronization process according to the response message to complete uplink synchronization. Accordingly, the UE can enter a network.

In the RACH of the existing system, a preamble is transmitted on the assumption of a single antenna UE and the BS can obtain a reception diversity gain through multiple antennas. However, this is not suitable for a multi-antenna UE to be used in a next-generation wireless communication system. In case of a multi-antenna system, several radio frequency (RF) chains exist. The amount of power output by each RF chain is limited. In case of multi-antenna UE, the sum of output power from each antenna is total output power. When output power of UE is set to be the maximum and a preamble is transmitted from every antenna of the UE according to the existing preamble transmission method, the BS may not be able to properly receive the preamble, because the preamble received by the BS may be destructive and accumulated.

The TDD scheme has channel reciprocal properties that the characteristics of an uplink channel and the characteristics of a downlink channel are substantially reciprocal. Thus, the UE can estimate the characteristics of the uplink channel through the characteristics of the downlink channel. However, it is difficult for the UE to know about the characteristics of the uplink channel through any other methods than the TDD scheme. The uncertainty of the channel and the uncertainty of the number of multiple antennas used by the UE make it difficult to guarantee that the BS can constructively receive the preamble. Thus, each preamble transmitted from each antenna of the UE must be transmitted such that the preambles can be discriminated by the BS. The UE may have only one antenna or two or more antennas according to its performance. Thus, in generating a preamble, a preamble that does not discriminate the single-antenna UE and the multi-antenna UE must be generated. Also, a reception scheme regardless of the number of antennas of the UE must be applied to the BS. The UE may inform the BS about the number of antennas of the UE through a preamble transmission.

Figure 5:
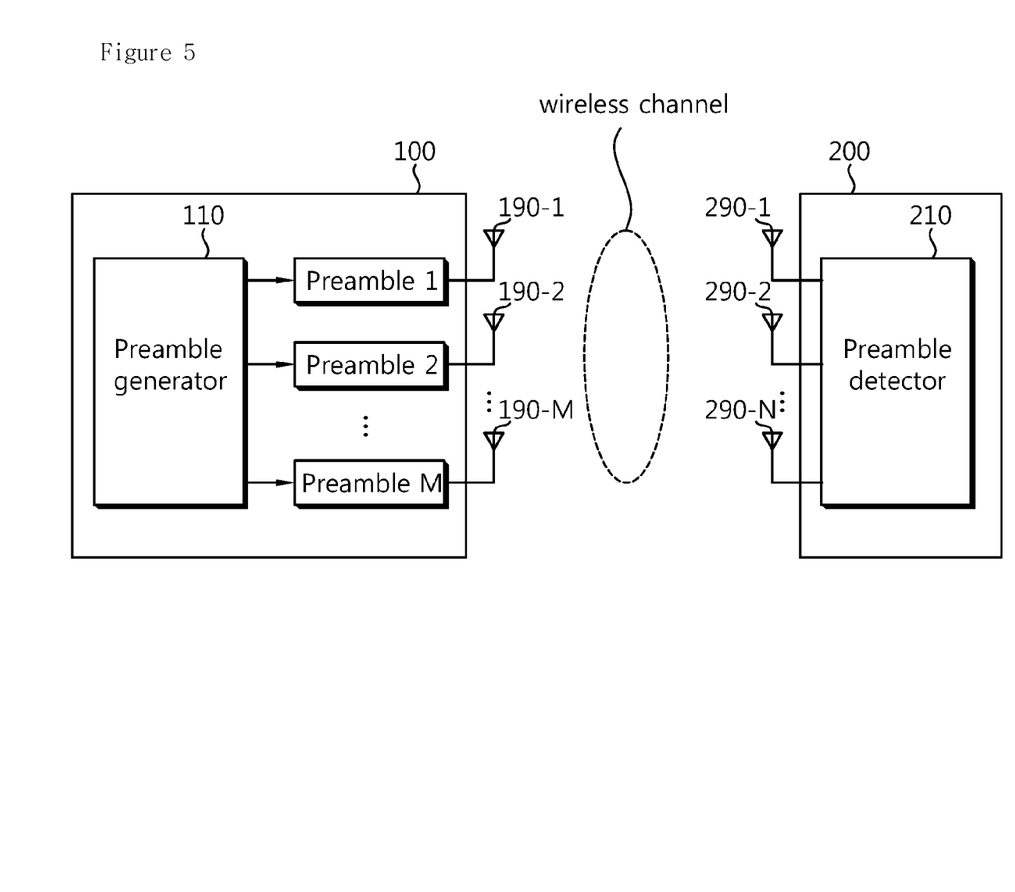
FIG. 5 is a schematic block diagram showing a wireless communication system for transmitting and receiving a random access preamble by using multiple antennas.

FIG. 5 is a schematic block diagram showing a wireless communication system for transmitting and receiving a random access preamble by using multiple antennas.

With reference to FIG. 5, the UE 100 includes a preamble generator 110, and a plurality of antennas 190-1, 190-2, . . . , 190-M (M is a natural number). The preamble generator 110 generates preambles Preamble 1, Preamble 2, . . . , Preamble M. Each of the plurality of antennas transmits a preamble to the BS 200.

The BS 200 includes a preamble detector 210 and a plurality of antennas 290-1, 290-2, . . . , 290-N (N is a natural number). The BS 200 receives a signal which has passed through a wireless channel. The BS 200 detects the preamble the UE 100 has transmitted from the reception signal.

There may be various methods for generating a preamble by the UE for a random access supporting multiple antennas. Hereinafter, a method for generating a preamble for a random access supporting multiple antennas by a UE will now be described with reference to FIGS. 6 to 12. FIGS. 6 to 12 illustrate the case in which the UE uses four antennas (ANT A, ANT B, ANT C, ANT D), but the number of the antennas of the UE is not limited thereto.

(1) Every antenna of the UE uses the same preamble

Figure 6:
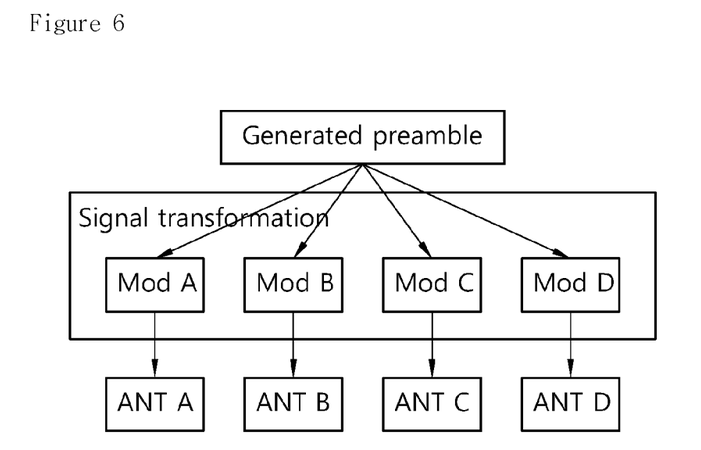
FIG. 6 illustrates a case in which every antenna of a user equipment (UE) uses the same preamble.

FIG. 6 illustrates a case in which every antenna of a user equipment (UE) uses the same preamble.

With reference to FIG. 6, the UE generates a preamble. The preamble may be generated in the manner as shown in FIGS. 3 and 4. The UE uses the same preamble in every antenna regardless of the number of the antennas thereof. The UE may simultaneously transmit the preamble through each antenna without processing it. Alternatively, the UE may perform a signal modification on the preamble correspondingly according to each antenna. When the UE can know supplementary information, the signal modification process may be performed so that the BS may receive a reinforced preamble. Supplementary information includes a channel correlation, channel information, and the like.

The generated preamble is inputted to a module of each antenna. The preamble inputted to the module of each antenna is the same. The module of each antenna modifies the preamble. For example, the antenna A ('ANT A') modifies the preamble through a module A ('Mod A'), the antenna B ('ANT B') modifies the preamble through a module B ('Mod B'), the antenna C ('ANT C') modifies the preamble through a module C ('Mod C'), and the antenna D ('ANT D') modifies the preamble through a module D ('Mod D').

Each antenna module may determine the polarity of the preamble or correct the phase so that the reception signal can be reinforced at the BS. When a channel correlation between antennas is great, a polarity ('+' or '−') may be applied to a signal according to the sign of correlation. The phase may be corrected in the time domain or the frequency domain. The preamble modified through each antenna module is transmitted through each antenna.

In case of the TDD system, the UE can know about supplementary information by using the channel reciprocal properties. However, in case of the FDD system, the channel reciprocal properties cannot be used and the correlation characteristics between antennas cannot be assumed. Thus, in the FDD system, the use of the same preamble by every antenna of the UE may be possible in a particular situation.

(2) In case that several RACHs are in use

Figure 7:
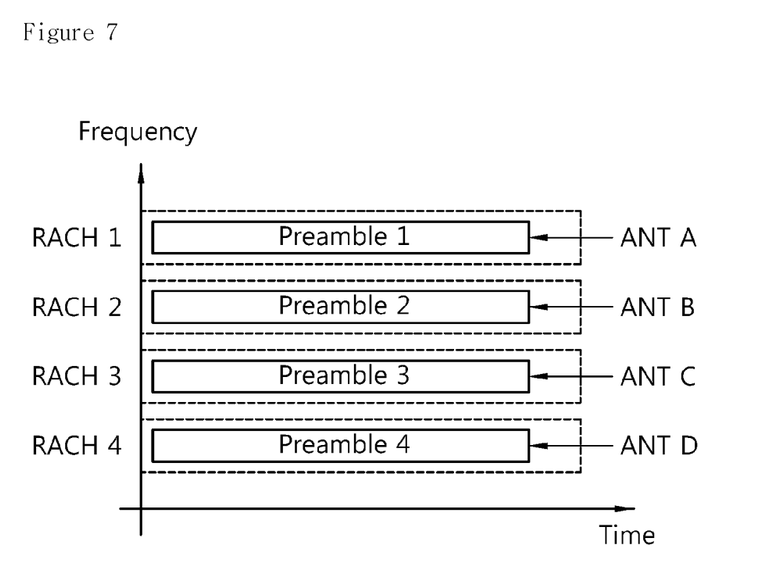
FIG. 7 illustrates a case of using several random access channels.

FIG. 7 illustrates the case of using several RACHs. Four RACHs (RACH 1, RACH2, RACH3, RACH4) are provided in the resource domain formed by the time axis and the frequency axis. However, the number of the RACHs is not limited thereto.

With reference to FIG. 7, several RACHs are simultaneously defined in a certain interval of the time domain. The several RACHs can be discriminated by using different frequency domains. The UE selects one of the several RACHs for each antenna. The UE transmits a preamble via the RACH selected for each antenna. The preambles transmitted by the respective antennas may be the same or different. For example, four RACHs (RACH 1, RACH 2, RACH 3, RACH 4) are defined, and the UE uses four antennas (ANT A, ANT B, ANT C, ANT D). The UE selects one RACH for each antenna. For example, antenna A (ANT A) selects RACH1 to transmit a first preamble (Preamble 1). Antenna B (ANT B) selects RACH2 to transmit a second preamble (Preamble 2). Antenna C (ANT C) selects RACH3 to transmit a third preamble (Preamble 3). Antenna D (ANT D) selects RACH4 to transmit a fourth preamble (Preamble 4). When the number of antennas of the UE is smaller than the number of defined RACHs, the UE may select RACHs as many as the number of antennas and transmit the preambles.

The BS may recognize the identity of each antenna of the UE through the RACHs. The BS can recognize whether or not preamble sequences received through several RACHs are signals which has been transmitted from a multi-antenna UE or signals which has been transmitted from a single-antenna UE through combination of inter-RACHs.

This method can be used for both the single-antenna UE and the multi-antenna UE without having to discriminate them. That is, this method can be used irrespective of the number of the antennas of the UE. In this case, however, more frequency resources may be required for the RACHs. Also, the time interval between RACHs may be lengthened.

(3) In case that each antenna of UE uses an independent preamble sequence

Figure 8:
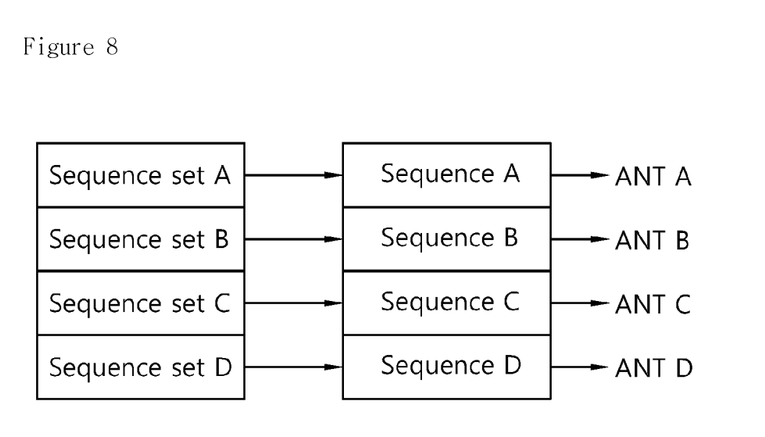
FIG. 8 illustrates a case in which each antenna of a UE uses an independent preamble sequence.

FIG. 8 illustrates a case in which each antenna of a UE uses an independent preamble sequence.

With reference to FIG. 8, each antenna of the UE independently selects a preamble sequence from preamble sequence sets. For example, antenna A (ANT A) selects sequence A as a preamble sequence from sequence set A and transmits the sequence A. Antenna B (ANT B) selects sequence B as a preamble sequence from sequence set B and transmits the sequence B. Antenna C (ANT C) selects sequence C as a preamble sequence from sequence set C and transmits the sequence C. Antenna D (ANT D) selects sequence D as a preamble sequence from sequence set D and transmits the sequence D. That is, preambles are generated by using an independent preamble sequence for each antenna. One UE uses independent sequences as many as the antennas. When each antenna selects a preamble sequence to be used, each antenna has the degree of freedom. In this case, the sequence sets from which preamble sequences are to be selected may be the same or different for each antenna. When each antenna uses a different sequence set, at least one of the plurality of sequence sets may be the same as that used by a single-antenna UE. Or, the sequence sets different for each of the antennas may have a portion overlapping with a sequence set used by the single-antenna UE. In this case, it would be appropriate for the sequence sets to have sequences whose cross-correlation is small. Meanwhile, the sequence sets used by the single-antenna UE and the sequence sets used by the multi-antenna UE may be defined to be different.

The BS detects a preamble through combination of the preamble sequences. The BS can recognize whether or not the detected preamble has been received from the single-antenna UE or from the multi-antenna UE.

(4) In case that each antenna of UE transmits preamble through time delay

The UE determines a certain time offset for each of the antennas and transmits a preamble through each antenna in the form of a mutual delay. In this case, the delay may be implemented as a simple time delay or a cyclic delay. Each antenna may use the same preamble sequence or a different preamble sequence. When each antenna uses the same sequence, the BS may perform the process of detecting the preamble sequence regardless of the number of antennas of the UE. When each antenna uses a different preamble sequence, the BS must perform the preamble sequence detection process several times. The BS can recognize whether or not the detected preamble is a preamble of the multi-antenna UE or a preamble of the single-antenna UE through combination of the preamble sequences.

Figure 9:
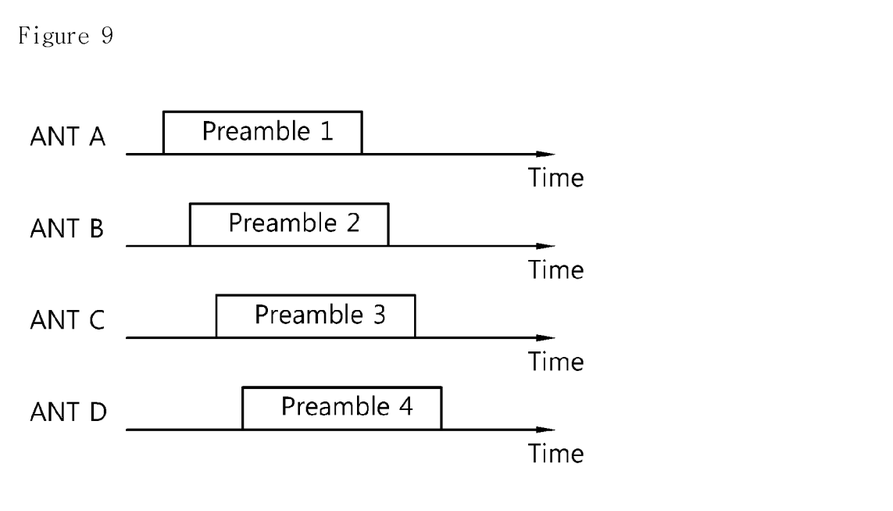
FIG. 9 illustrates an example of transmitting a preamble by each antenna of a UE through time delay.

FIG. 9 illustrates an example of transmitting a preamble by each antenna of a UE through time delay.

With reference to FIG. 9, the preambles transmitted by the respective antennas of the UE have a mutual offset over the transmission time. For example, the UE transmits a first preamble (Preamble 1) through antenna A (ANT A), and then after a certain time is delayed from the transmission of the first preamble, the UE transmits a second preamble (Preamble 2) through antenna B (ANT B). After a certain time is delayed from the transmission of the second preamble, the UE transmits a third preamble (Preamble 3) through antenna C (ANT C). After a certain time is delayed from the transmission of the third preamble, the UE transmits a fourth preamble (Preamble 4) through antenna D (ANT D). The preambles may be the same or different. The preambles transmitted by the respective antennas have a certain delay from each other. The preambles transmitted by the antennas may be set to have a certain interval temporally. The certain interval may not need to be different. Also, when each antenna sets a mutual delay difference, a delay profile of a channel may be considered. The mutual delay difference between the antennas may be set on the basis of the length of the cyclic prefix (CP) of an OFDM symbol. For example, the mutual delay difference between the antennas may be set to be a multiple of the CP.

Channel responses of the respective preambles transmitted from the respective antennas of the UE do not overlap, so the BS can receive the preambles wholly, properly.

Figure 10:
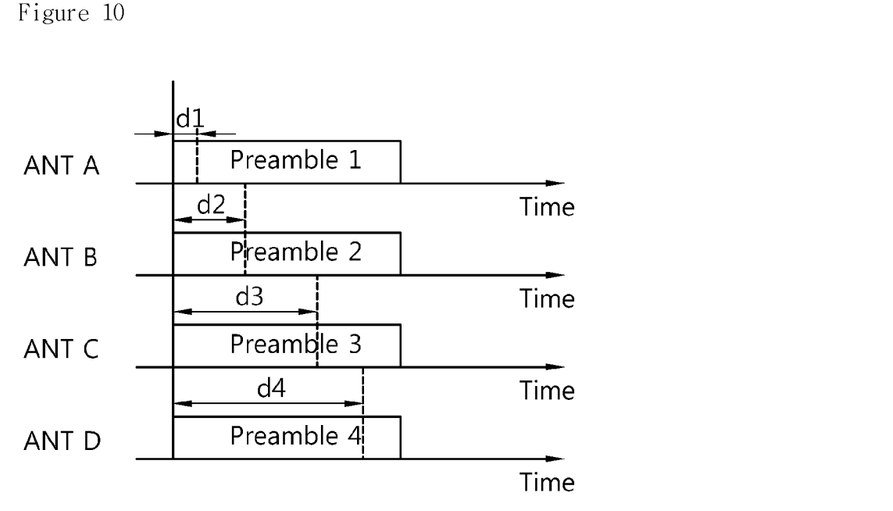
FIG. 10 illustrates another example of transmitting a preamble by each antenna of a UE through time delay.

FIG. 10 illustrates another example of transmitting a preamble by each antenna of the UE through time delay.

With reference to FIG. 10, preambles transmitted by the respective antennas are those have been cyclic-shifted by a certain delay at each antenna. Unlike the case illustrated in FIG. 9, in FIG. 10, the preambles are cyclic-shifted and then transmitted. Thus, the absolute timing at which the preambles themselves are transmitted can be set to be the same for every antenna of the UE. For example, antenna A cyclic-shifts a first preamble by d1, antenna B cyclic-shifts a second preamble by d2, antenna C cyclic-shifts a third preamble by d3, and antenna D cyclic-shifts a fourth preamble by d4. The preambles transmitted by the respective antennas have a certain circular delay from each other. This implementation can facilitate batch processing.

The case illustrated in FIG. 9 and the case illustrated in FIG. 10 may be combined to be implemented. In this case, the preambles transmitted by the respective antennas may be different.

(5) In case that preambles transmitted by the respective antennas are a portion of preamble sequences.

The preambles transmitted by the respective antennas are implemented by one selected preamble sequence. Sequences to be applied to the respective antennas of the UE may be implemented in the form by puncturing the selected preamble sequence. The punctured form may be applied in the time domain and frequency domain. The form punctured in the time domain is oversampling preambles and transmitting them. As the form punctured in the frequency domain, a form in which a preamble transmitted from a particular antenna is applied only to a particular subcarrier set may be assumed. When preambles are generated in this manner, there is no need to change the preamble sequence sets used for RACHs. Every UE can generate the same reception signal structure.

Figure 11:
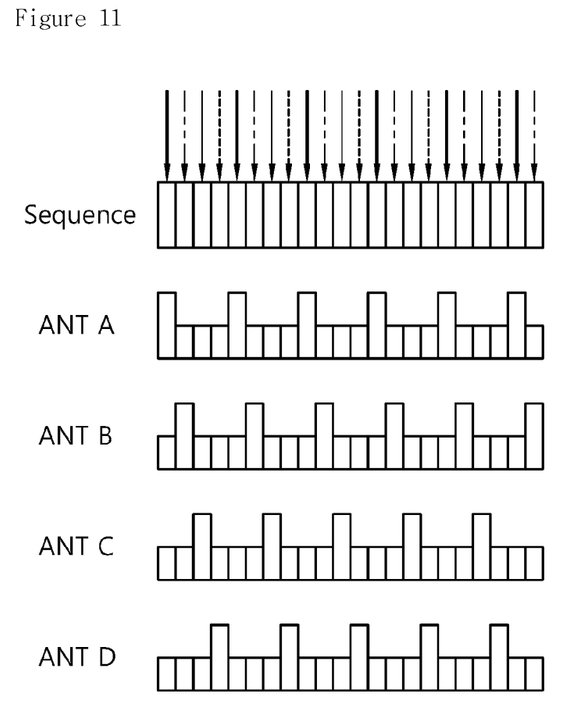
FIG. 11 illustrates an example in which a preamble transmitted by each antenna of a UE is part of a preamble sequence.

FIG. 11 illustrates an example in which a preamble transmitted by each antenna of a UE is part of a preamble sequence.

With reference to FIG. 11, a preamble sequence includes a plurality of elements. The UE divides the preamble sequence into sequence subsets corresponding to each of the plurality of antennas. That is, the plurality of elements constituting the preamble sequence are divided into several subsets. The respective antennas (ANT A, ANT B, ANT C, ANT D) uses the elements of the sequences expressed as long bars as a sequence subset, among the preamble sequences. The divided sequence subsets vary according to the number of antennas. For example, when the antennas of the UE is 2, the preamble sequences are two sequence subsets. In case of a single-antenna UE, the entire preamble sequences are transmitted through the single antenna.

The sequence subsets corresponding to the respective antennas may be disjoint. That is, the respective subsets may not have common elements. Each antenna selects a sequence subset corresponding to each antenna. Each antenna generates a preamble by using only the selected sequence subset and transmits the preamble. The small bars of each antenna are those remains which have not been selected, excluding the sequence subsets. The size of the remaining portions may be set to be 0. Or, a weak signal may be transmitted through the unselected remaining small bar portions. The UE may generate a preamble in the time domain and transmit it, regardless of whether or not the small bar portions are used. When the preamble is transmitted in the time domain, a phenomenon that total output power is not maximized at each symbol position may occur.

The UE uses one preamble sequence. The preamble sequence may be randomly selected from a set of preamble sequences. The preamble sequence set can be generated from CAZAC sequence. For example, the preamble sequence set may include a root ZC sequence and sequences cyclic-shifted in the units of cyclic shifts from the root ZC sequence. One or more root ZC sequences may exist.

The root ZC sequence having a root index u may be defined as represented by Equation 1 shown below:

$$x_u(n) = \exp\left\{-\frac{j\pi un(n+1)}{N}\right\}, \quad \text{[Equation 1]}$$
when $N$ is odd number $$x_u(n) = \exp\left\{-\frac{j\pi un^2}{N}\right\}, \text{ when } N \text{ is even number}$$

Here, N is the length of ZC sequence, n is $0 \leq n \leq N-1$, u is a natural number of N or smaller, and u and N are relatively prime. When N is a prime, the number of root index u is N−1.

A sequence cyclic-shifted from the root ZC sequence having the root index u can be defined as represented by Equation shown below:

$$x_{u,v}(n) = x_u((n+C_v) \bmod N) \quad \text{[Equation 2]}$$

Here, $C_v$ is a cyclic shift unit.

The BS may broadcast information regarding the root ZC sequence and information regarding the cyclic shift unit to the UE. The information regarding the root ZC sequence may be information regarding the root index. The UE within a cell may receive the information regarding the root ZC sequence and the information regarding the cyclic shift unit and generate a preamble sequence set.

Figure 12:
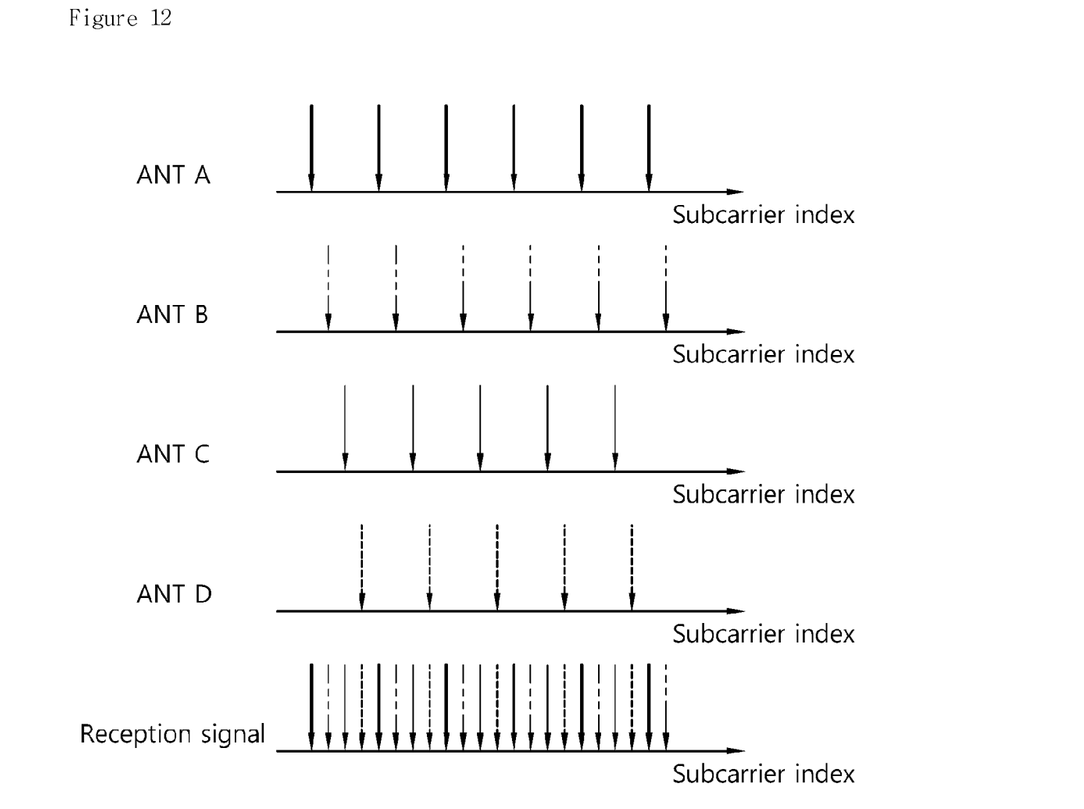
FIG. 12 illustrates another example in which a preamble transmitted by each antenna of a UE is part of a preamble sequence.

FIG. 12 illustrates another example in which a preamble transmitted by each antenna of a UE is part of a preamble sequence.

With reference to FIG. 12, when the UE generates preambles from a preamble sequence, it uses different subcarriers for each antenna. That is, the preamble sequence of each antenna is mapped to different subcarrier subsets.

The UE divides the plurality of subcarriers into subcarrier subsets corresponding to each of the plurality of antennas. That is, the UE divides the plurality of subcarriers into several subsets. The divided subcarrier subsets may vary according to the number of antennas. For example, when the number of the antennas of the UE is 2, the plurality of subcarrier may be divided into two subcarrrier subsets. In case of a single-antenna UE, the preamble sequence may be mapped to all of the plurality of subcarriers to generate preambles.

Preambles are generated from the preamble sequence by using the subcarrier subsets corresponding to each of the plurality of antennas. The UE transmits the preambles generated for each of the plurality of antennas. The subcarrier subsets corresponding to each antenna can be disjoint. That is, the respective subcarrier subsets may not have common subcarriers.

The UE applies the preambles to be transmitted by each antenna from the preamble sequence in the frequency domain. When the preambles are generated from the preamble sequence in the frequency domain, the UE selects subcarrier subsets to be used by the respective antennas. That is, this can be interpreted such that each antenna uses only a particular subcarrier subset. When each antenna uses even the non-selected subcarrier index, it may be considered as a case in which all the subcarriers are used to generate preambles. However, in order for the BS to discriminate the preambles transmitted from the respective antennas, preferably, the subcarriers of the non-selected subcarrier index are not used. When the preambles are generated in the frequency domain in this manner, transmission power with respect to the preambles can be obtained to its maximum level from all the antennas.

The BS receives the total of the same preamble sequence regardless of the number of transmission antennas of the UE. Although different channels are generated for the respective antennas of the UE and the BS, the BS can discriminate and detect all the preambles by the subcarriers, or detect them collectively.

Unlike the foregoing assumption, the transmission method by antennas may be applied even when each antenna does not transmit a portion of one sequence. That is, even though the signals transmitted from the respective antennas are extracted from separate sequences, the subcarrier sets for transmitting signals from the respective antennas may vary or a power profile may be applied differently.

Figure 13:
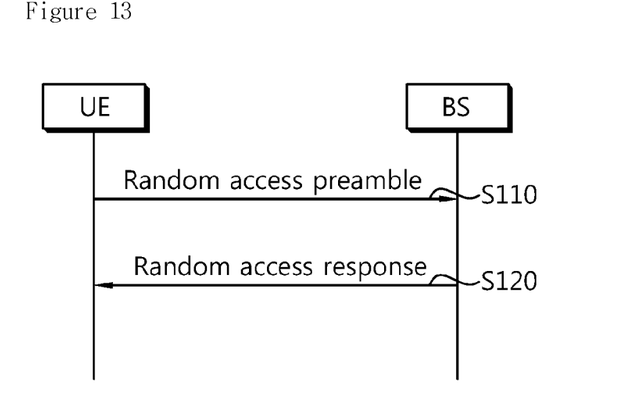
FIG. 13 illustrates an example of a method of performing random accessing.

FIG. 13 illustrates an example of a method of performing random accessing.

With reference to FIG. 13, the UE transmits random access preambles to the BS (S110). In this case, the random access preambles may be transmitted through a RACH.

The preambles transmitted by the UE may be generated according to the method for generating a preamble supporting multiple antennas as described above. For example, a preamble generator of the UE divides a preamble sequence into sequence subsets which correspond to each of the plurality of antennas. The preamble generator may generate preambles by using the sequence subsets which correspond to each of the plurality of antennas. The UE transmits the preambles generated for each antenna through the plurality of antennas.

The BS transmits a random access response to the UE (S120). The random access response includes timing alignment information. Also, the random access response may include information regarding an uplink radio resource allocation, and the like. Upon receiving the random access response, the UE may perform uplink synchronization by using the timing alignment information.

As described above, the method for generating a preamble for a random access supporting multiple antennas in the wireless communication system can be provided. The BS may receive preambles without having to discriminating a single-antenna UE and a multi-antenna UE. The same set of the preamble sequences within a cell as that of the related art can be used as it is without any alteration. Thus, compatibility with the existing system can be easily maintained. Also, because the UE can transmit preambles by using multiple antennas, output power can be maximized. Thus, overall system performance can be improved.

All the foregoing functions can be performed by processors such as a microprocessor, a controller, a microcontroller, an ASIC (Application Specific Integrated Circuit) according to software coded to perform the functions or program codes. Designing, development, and implementation of the codes may be obvious to the skilled person in the art based on the description of the present invention.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

The invention claimed is:

1. A method for generating a preamble for a random access, performed by a user equipment (UE) having a plurality of antennas, in a wireless communication system, the method comprising:
dividing a preamble sequence into sequence subsets
generating preambles by using the sequence subsets, each of the preambles corresponding to each of the plurality of antennas; and
transmitting the preambles simultaneously through the plurality of antennas,
wherein the sequence subsets are generated by puncturing the preamble sequence such that the sequence subsets are disjoint each other and,
wherein the preambles are transmitted by using different subcarrier sets each other.

2. The method of claim 1, wherein the preamble sequence is selected from a set of a plurality of sequences generated from a Zadoff-Chu (ZC) sequence.

3. The method of claim 2, wherein the set comprises the ZC sequence and a sequence cyclic-shifted by cyclic shift unit from the ZC sequence.

4. The method of claim 3, further comprising:
receiving information regarding the ZC sequence and information regarding the cyclic shift unit.

5. A method for performing random access, performed by a user equipment (UE) having a plurality of antennas, in a wireless communication system, the method comprising:
dividing a preamble sequence into sequence subsets
generating preambles by using the sequence subsets, each of the preambles corresponding to each of the plurality of antennas, and transmitting the same; and
receiving a random access response including timing alignment information,
wherein each of the sequence subsets is generated by puncturing the preamble sequence such that the sequence subsets are disjoint each other and,
wherein the preambles are transmitted by using different subcarrier sets each other.

6. A user equipment (UE) comprising:
a plurality of antennas; and
a preamble generator configured to:
divide a preamble sequence into sequence subsets and generate preambles by using the sequence subsets, each of the preambles corresponding to each of the plurality of antennas, and
transmit the preambles simultaneously through the plurality of antennas, wherein each of the sequence subsets is generated by puncturing the preamble sequence such that the sequence subsets are disjoint each other and, wherein the preambles are transmitted by using different subcarrier sets each other.

* * * * *